(12) United States Patent
Meegoda et al.

(10) Patent No.: US 12,528,721 B2
(45) Date of Patent: Jan. 20, 2026

(54) ULTRASOUND DEVICE FOR DESTRUCTION OF ORGANIC CHEMICALS

(71) Applicant: New Jersey Institute of Technology, Newark, NJ (US)

(72) Inventors: Jay Meegoda, Orange, NJ (US); Jitendra Kewalramani, Iselin, NJ (US)

(73) Assignee: New Jersey Institute of Technology, Newark, NJ (US)

( * ) Notice: Subject to any disclaimer, the term of this patent is extended or adjusted under 35 U.S.C. 154(b) by 374 days.

(21) Appl. No.: 18/024,423

(22) PCT Filed: Sep. 3, 2021

(86) PCT No.: PCT/US2021/049007
§ 371 (c)(1),
(2) Date: Mar. 2, 2023

(87) PCT Pub. No.: WO2022/051587
PCT Pub. Date: Mar. 10, 2022

(65) Prior Publication Data
US 2023/0264983 A1 Aug. 24, 2023

Related U.S. Application Data

(60) Provisional application No. 63/074,562, filed on Sep. 4, 2020.

(51) Int. Cl.
*C02F 1/36* (2023.01)
*B06B 1/06* (2006.01)
(Continued)

(52) U.S. Cl.
CPC .............. *C02F 1/36* (2013.01); *B06B 1/0607* (2013.01); *C02F 1/68* (2013.01); *B06B 2201/71* (2013.01);
(Continued)

(58) Field of Classification Search
None
See application file for complete search history.

(56) References Cited

U.S. PATENT DOCUMENTS

| 4,076,617 A | 2/1978 | Bybel et al. |
| 5,597,265 A | 1/1997 | Gallo |

(Continued)

FOREIGN PATENT DOCUMENTS

| AU | 2001293471 B2 | 5/2005 |
| CN | 101935087 A | 1/2011 |

(Continued)

OTHER PUBLICATIONS

Asakura, Y., "Chapter 5—Experimental Methods in Sonochemistry," Sonochemistry and the Acoustic Bubble, pp. 119-150 (2015).
(Continued)

*Primary Examiner* — Krishnan S Menon
(74) *Attorney, Agent, or Firm* — McCarter & English, LLP (57) ABSTRACT

A treatment method and system using high-frequency ultrasound for treating a waste stream containing per- and polyfluoroalkyl substance (PFAS) is disclosed. The system has one or more reactors including one or more transducers configured to operating at one or more frequencies to destroy or mineralize the per- and polyfluoroalkyl substances (PFAS) in the waste stream using sonolysis.

17 Claims, 4 Drawing Sheets

(51) Int. Cl.
  *C02F 1/68* (2023.01)
  *C02F 101/36* (2006.01)
(52) U.S. Cl.
  CPC .... *C02F 2101/36* (2013.01); *C02F 2201/007* (2013.01); *C02F 2301/08* (2013.01)

(56) References Cited

U.S. PATENT DOCUMENTS

| | | | |
|---|---|---|---|
| 5,611,993 A * | 3/1997 | Babaev | A61L 2/025 210/748.03 |
| 6,019,852 A | 2/2000 | Pedziwiatr et al. | |
| 8,951,354 B2 | 2/2015 | Sinha | |
| 2004/0026334 A1 | 2/2004 | Soll et al. | |
| 2007/0283985 A1 | 12/2007 | Goodson | |
| 2008/0076954 A1 | 3/2008 | Suri et al. | |
| 2010/0096337 A1 | 4/2010 | Mader et al. | |
| 2019/0226315 A1 | 7/2019 | Laramay et al. | |

FOREIGN PATENT DOCUMENTS

| | | | |
|---|---|---|---|
| CN | 110844968 A * | 2/2020 | C02F 1/36 |
| WO | 1997028294 A1 | 8/1997 | |
| WO | 2003072506 A2 | 9/2003 | |
| WO | 2004028717 A1 | 4/2004 | |

OTHER PUBLICATIONS

Batagoda, J. H., et al., "In Situ Remediation of Passaic River Sediments Using Ultrasound and Ozone Nanobubbles," World Environmental and Water Resources Congress 2018, 49-63.

Batagoda, J. H., et al., "Remediation of Heavy-Metal-Contaminated Sediments in USA Using Ultrasound and Ozone Nanobubbles," Journal of Environmental Engineering and Science, (2019), 14(2): 130-138.

Gole et al., Sono-chemical treatment of per- and poly-fluoroalkyl compounds in aqueous film-forming foams by use of a large-scale multi-transducer dual-frequency based acoustic reactor. Ultrasound. Sonochem, 45, pp. 213-222 2018.

Gole et al., Treatment of Perfluorooctane Sulfonic Acid (PFOS) Using a Large-Scale Sonochemical Reactor, Sep. Purif. Technol, 194, pp. 104-110 2018.

International Search Report and Written Opinion from related PCT Application No. PCT/US2021/049007 issued Nov. 23, 2021.

Interstate Technology & Regulatory Council Contaminated Sediments Team, Contaminated Sediment Remediation (CS-2): Washington, DC, 2014 (514 pgs).

Mahinroosta, R., and Senevirathna, L., A Review of the Emerging Treatment Technologies for PFAS Contaminated Soils: J. Environ. Manage. 255 pp. 109896 2020.

Meegoda J., Veerawat K, Ultrasound to Decontaminate Organics in Dredged Sediments: Soil Sediment Contamination, An Int. J. 11 pp. 91-116 2002.

Meegoda, J. N. and Perera, R., Ultrasound to Decontaminate Metals in Dredged Sediments: Journal of Hazardous Materials, vol. 85#1-2, pp. 73-89, 2001.

Non-Final Office Action from related U.S. Appl. No. 17/154,872 dated Jul. 6, 2023.

Pétrier, The Use of Power Ultrasound for Water Treatment. University Joseph Fourier, Grenoble, France. King Abdulaziz University, Jeddah, Saudi Arabia. 2015 (34 pgs).

Shrestha et al., Effect of Ultrasound on Removal of Persistent Organic Pollutants (POPs) from Different Types of soils: J. Hazard. Mater. 170 pp. 871-875 2009.

Son, Y. Advanced Oxidation Processes Using Ultrasound Technology for Water and Wastewater Treatment. In Handbook of Ultrasonics and Sonochemistry; Ashokkumar, M., Ed.; 2016.

Song et. al., Evaluation Methods for Assessing Effectiveness of In Situ Remediation of Soil and Sediment Contaminated with Organic Pollutants and Heavy Metals: Environ. Int. 105, pp. 43-55, 2017.

US Environmental Protection Agency, Contaminated Site Clean-Up Information. Technology Focus. CLU-IN 2020 (available at https://clu-in.org/techfocus/), one page.

US Environmental Protection Agency, In Situ Treatment Technologies for Contaminated Soil: Washington, DC, 2006 (35 pgs).

US Environmental Protection Agency, Use of Amendments for In Situ Remediation at Superfund Sediment Sites: Washington DC, 2013 (60 pgs).

* cited by examiner

ULTRASOUND DEVICE FOR DESTRUCTION OF ORGANIC CHEMICALS

CROSS-REFERENCE TO RELATED APPLICATIONS

This patent application is a 35 U.S.C. § 371 National Stage filing based on International Application No. PCT/US2021/049007, filed on Sep. 3, 2021, which application claims priority to and the benefit of U.S. Provisional Application No. 63/074,562, filed on Sep. 4, 2020, the content of which are incorporated by reference herein in their entireties.

STATEMENT REGARDING FEDERALLY SPONSORED RESEARCH

This invention was made with government support under Agreement No. 1634857 awarded by the National Science Foundation. The government has certain rights in the invention.

FIELD OF THE DISCLOSURE

The present disclosure relates to the degradation of per- and polyfluorinated (PFAS) in aqueous waste streams using high-frequency ultrasound. In particular, the present disclosure relates to the use of ultrasound, specifically sonochemistry, for on-site remedial methods to treat PFAS in high concentration waste streams.

BACKGROUND

Per- and polyfluoroalkyl substances (PFAS) are a large and complex class of anthropogenic compounds. PFAS have led to strong public and regulatory response due to their ubiquitous presence in environmental media, persistence, and potential toxicity to human and ecological receptors. PFAS have become widely distributed in the environment, and they are detected in surface and groundwater at thousands of locations in the United States and around the world. PFAS comprise a diverse group of synthetic chemicals used for over 50 years. The PFAS contains covalent C—F bonds, the shortest and strongest bond in nature. This is responsible for their thermal and chemical stability. This property, in conjunction with the ability of PFAS to lower surface tension, has made PFAS ideal for a wide range of industrial and commercial applications such as non-stick coatings, textiles, and firefighting foams. These same properties also render PFAS bio-accumulative, toxic, and ubiquitous in the environment. Although long-chain PFAS molecules are no longer manufactured in the United States, many shorter-chain PFAS are still in use. Major sources of PFAS release to the environment that have the potential for significant environmental impact include fire training/fire response sites, industrial sites, landfills, and wastewater/biosolid treatment plants.

Perfluoroalkyl acids (PFAAs) ($C_nF_{2n+1}$—R) are a class of PFAS with fully fluorinated (perfluoro-) alkanes. They have received considerable attention due to their widespread detection in the environment. Their chemical structure consists of a chain (or tail) of two or more carbon atoms with a charged functional group or head. In the carbon atom chain, fluorine atoms are attached to all the possible carbon atom bonding locations, except for one location on the last carbon atom where the functional group is attached. Based on the attached functional group, the PFAAs class can be divided into the perfluoroalkyl carboxylates (PFCAs) and sulfonates (PFSAs). Perfluorooctane sulfonate (PFOS) and perfluorooctane carboxylate (PFOA) are the most frequently detected PFSAs and PFCAs compounds in the ecosystem, respectively. Biotic and abiotic degradation of most polyfluoro substances (i.e., non-fully fluorinated PFAS) results in the formation of PFAAs. Polyfluoroalkyl substances that degrade to create terminal PFAAs are referred to as "precursors."

The need for remediation of per- and polyfluoroalkyl substances (PFAS) is growing as a result of societal and regulatory awareness and rapidly evolving toxicologist research on this new class of contaminants. However, the treatment technologies for PFAS in environmental media are still evolving, and the "end," that is, the final treatment objectives or goals, appear to be in constant flux due to the plethora of proposed state or federal regulations and guidelines, as are the tools available to achieve that end. Due to the significant uncertainty with regulations and with the endpoint of a given PFAS remediation strategy, the industry is prioritizing the protection of drinking water supplies and human health. Thus, PFAS site remediation work has focused primarily on treating PFAS impacted liquid streams (for example, groundwater, drinking water, landfill leachates, wastewater, and industrial discharges) that are directly or indirectly affecting the drinking water sources.

Treatment technologies exploit a contaminant's chemical and physical properties to immobilize, remove, or destroy the contaminant. Due to the stability and recalcitrant nature of PFAS, many existing and commercialized water remediation technologies that have been developed for other contaminant classes (e.g., PCBs, PAHs), e.g., air sparging, enhanced aerobic bioremediation, chemical oxidation using different oxides such as Permanganate ($MnO_4^-$), Fenton's (hydrogen peroxide [$H_2O_2$] and Ferrous iron [$Fe^{2+}$]) or Ozone ($O_3$) have shown limited success in mineralizing PFAS.

Full-scale treatment of PFAS-impacted liquid (e.g., groundwater, drinking water, etc.) are currently limited to sequestration technologies that remove or bind PFAS but do not destroy them. In this regard, the current and most common state of the practice for the treatment of water impacted by PFAS generally involves the use of separation technologies involving sorption/sequestering (such as granular activated carbon (GAC) and/or ion exchange resins (IX)). However, these treatment approaches are interim actions and involve the physical mass transfer (sequester) and do not destroy (mineralize) PFAS. These approaches are being used to process extremely large volumes of liquid with low PFAS concentrations, typically in part per trillion range (ppt) to low part per billion range (ppb) and yield a much smaller volume of concentrated PFAS waste, which requires subsequent disposal or incineration. Reverse osmosis (RO) is extremely effective in removing PFAS regardless of chain length. However, RO systems are very expensive.

Although IX resin systems are more expensive than GAC, due to the higher adsorption capacities of IX, shorter contact times, and smaller equipment footprints, IX applications are gaining popularity over those of GAC. More importantly, IX can be regenerated on-site to its nearly virgin capacity and hence used repeatedly while on-site regeneration of GAC is not feasible. Currently, a limited number of full-scale regenerable IX systems have been commercially installed, but it is expected that additional regenerable IX systems will be installed across the United States. Foam fractionation and ozone fractionation are two other emerging treatment technologies; however, they, too, generate concentrated waste streams requiring further processing. For foam fractionation and ozone fractionation, the concentrated PFAS waste stream is typically 0.5 percent to 2 percent of the influent volume with a more than 1000-fold increase in the concentration of PFAS.

The PFAS concentrate may be associated with a solid phase, as in the case of granular activated carbon (GAC) treatment, or it may be in a water-based concentrate, as in the case of regeneration of IX resin, reverse osmosis (RO), and foam fractionation/ozone fractionation. Currently, concentrated PFAS waste requires further handling and disposal, such as long-term storage or landfill disposal and/or incineration. Storage of the waste streams is not a long-term option and is a financial liability due to its stability and health hazards. Currently, high concentration PFAS waste is typically incinerated at off-site facilities, which is an expensive and energy-intensive approach. Also, the potential for the emission of PFAS byproducts such as fluorinated and mixed halogenated organic from incinerators into the environment has raised health concerns for neighboring communities.

Several emerging destruction-based technologies are gaining attention as an advance remedial measure for PFAS impacted water, including sonolysis, electrochemical treatment, plasma treatment, hydrothermal process, and a combination of advanced oxidation and advanced reduction processes (AOP/ARP). The present challenges with these destruction-based technologies include comprehensive PFAS destruction as well as energy consumption limitations for field-scale applications. These technologies have a high energy demand and relatively higher capital cost. These technologies are also generally not applicable to high volume, rapid flow rate applications common to PFAS impacted water streams (e.g., drinking water, groundwater).

Ultrasound provides an efficient, sustainable, and easy approach to handle and degrade pollutants, requiring only electrical energy. Although ultrasonic applications in water and wastewater treatment and environmental remediation involving sonochemical degradation of pollutants are still in the lab-scale and developing stage, they are growing more rapidly and have received considerable attention as ultrasound holds promise as a green and sustainable technology.

Ultrasonics is a branch of acoustics dealing with the generation and use of inaudible sound waves. Ultrasonics applications are rigidly classified as being either low-intensity (popularly known as non-destructive applications) or high-intensity applications (also known as power ultrasonics). Some of the common ultrasonic non-destructive low-intensity applications include testing and imaging used as means of exploration, detection, and information (e.g., the location of the crack, material properties). High-intensity ultrasound can permanently change the physical, chemical, or biological properties of a medium or, if intense enough, can even destroy the medium to which it is applied. The uses of high-power ultrasonic include cleaning, enhancing chemical reactions, degradation of pollutants, extractions, emulsification and dispersion, food processing, ultrasonic agglomeration, welding of metals and polymers, machining and metal forming in solids and fluids, etc.

Acoustic cavitation describes the phenomena associated with the propagation of intense sound waves in liquids generating micro-nano bubbles (MNBs). This phenomenon involves three discrete stages: nucleation (bubble formation), bubble growth, and, under proper conditions, implosive collapse. The dynamics of bubble collapse cause several strong sonophysical effects, such as microjet, microstreaming, mechanical rupture, friction and broadband acoustic emissions (noise and shock waves), and sonochemical reactions, including pyrolysis and radical reactions. These physical effects and/or chemical reactions form the basis for most high-power applications. The applications of ultrasonic technology using acoustic cavitation are growing rapidly in a variety of industrial areas ranging from emulsification, materials science, food chemistry, medicinal research, environmental remediation areas, etc.

The energy released due to bubble collapse drives the material (matter) inside the bubble to the instantaneous plasma state, achieving very high temperatures (e.g., on the order of several thousand degrees Celsius) and very high pressures (e.g., on the order of several hundred bars) in a localized volume for short lifetimes (e.g., nanoseconds). These extreme conditions generated during bubble collapse provide energy for the breakage of bonds in water, and dissolved gas molecules inside the bubble, leading to the formation of different reactive species such as hydroxyl radicals, hydrogen atoms, oxygen atoms, and hydroperoxyl radicals. Besides radical species, the formation of hydrated electrons is debated to exist at the bubble interface and possibly in the bulk solution. The application of ultrasound waves, i.e., sonolysis, sonochemical degradation, or sonolytic decomposition, involves pyrolysis (thermolysis) and reaction with reactive species (mainly radicals) that break down or decompose environmental pollutants.

When a bubble collapses, it acts as a microreactor that has three different active regions where chemical reactions occur: (1) bubble gas-liquid interface, (2) inside the bubble gas, and (3) in the bulk liquid region. Pyrolysis occurs more in the bubble gas and at the gas-liquid interface. Amphiphilic PFAS such as PFOS and PFOA have both hydrophobic and oleophobic (perfluoroalkyl tail) and hydrophilic functional groups (head) behaving as an anionic surfactant. The PFAS molecules migrate and accumulate at the bubble-liquid interfacial region and its degradation is mainly attributed to high-temperature pyrolysis or to radical and solvated electron attack from plasma state created during bubble collapse. Operational parameters affecting the fate of cavitation bubbles and sonolytic decomposition can be grouped into five categories, as shown in Table 1 below. They are ultrasonic, solution/experimental, contaminant, transducer and geometric factors. The parameters affecting the sonolytic degradation and defluorination rate of PFAS are frequency, power density, the geometrical arrangement of the transducers, the reactor geometry, type of sparge gas, the initial concentration of PFAS, molecular structure/weight, and presence of co-contaminant.

TABLE 1

Ultrasonic and environmental factors affecting the fate of cavitation bubbles and the sonochemical degradation.

| Group | Affecting Factors | Influence on |
|---|---|---|
| Ultrasonic Factors | Applied frequency<br>Input power/Intensity<br>Irradiation time<br>Continuous and pulse irradiation<br>Irradiation method (direct/superimposed/indirect method) | Characteristics and fate of cavitation bubble that contribute to PFAS mineralization |
| Transducer | Type of transducer (plate/horn)<br>Radiation area<br>Transducer location/array<br>Arrangement Method | Current demand for scale-up and industrial use of ultrasound technology in the environmental and chemical engineering field |
| Geometric factors | Reactor shape/material<br>Irradiation distance (from the sound source to reflecting boundaries)<br>Volume<br>Mixing/aeration/internal structure | |
| Experimental factors | Dissolve gases and ions<br>Temperature, pressure, and pH<br>Solution type | Degree of cavitation effects such as pyrolysis and radical reactions as well as the behavior of bubbles |
| Contaminant Factors | Volatility/hydrophobicity<br>Molecular structures/Weight<br>Initial concentration<br>Presence of multiple contaminants | Degree of sonochemical degradation and order of pollutant removal when multiple contaminants present. |

The frequency of ultrasound plays an important role in sonolytic technology. It directly affects the effective cavitation events per unit time, bubble size, the degree of heat generated upon collapse, the movement of gases and volatile species toward the bubble cavity, and the movement of active radical species from the cavity. Generally, the sonochemical yield or the maximum reaction rate induced by acoustic cavitation is obtained between 200 and 1000 kHz. Low-frequency ultrasound has less symmetrical bubble implosion, fewer bubble events, more violent collapse, and bigger resonant bubble size. With an increase in frequency, the number of effective cavitation bubbles, the diffusion of gases and volatile compounds into bubbles increases. However, with a rise in the frequency, the size of the collapsing bubbles, the heat generated upon collapse, and the duration of the collapse decrease. The optimum frequency for sonolytic decomposition of PFAS has been reported by different research groups varied from 400 KHz and 1,000 KHz as they have used different geometric parameters and power densities. However, the sonochemical degradation of a given organic contaminant (depending upon volatility/hydrophobicity) increases with an increase in frequency, reaches a maximum value, and then decreases.

The production of a cavity in liquid requires a negative pressure for sufficient duration and/or intensity to initiate the cavitation or let the cavitation grow bigger. With the increase in frequency, the rarefaction cycle of sound wave shortens. Thus, the cavitational threshold (i.e., sound intensity when the first cavitation occurs for increasing power) increases with increasing ultrasonic frequencies. In other words, higher acoustic pressure is required to overcome the tensile strength of the liquid molecule to produce cavitation in liquids at higher ultrasonic frequencies. Additionally, with an increase in frequency, the attenuation of the sound wave due to absorbance also increases, and it may result in a small cavitation zone in front of the transducer at higher acoustic frequency. Thus, it may be necessary to increase the amplitude of irradiation to maintain the same cavitational effects at a point x distance from the piezoelectric crystals operating at a higher frequency. Also, for a given acoustic frequency, the increase in the pressure amplitude or the input power (beyond the cavitational threshold power) can increase the number of cavitational events, the temperature of collapse, and the sonochemical efficiency (degradation rate). However, optimum power intensity can be observed corresponding to the highest reaction rate. Beyond that point, a further increase in power causes a decline in the reaction rate due to acoustic shielding, whereby the formation of cavitation bubble clouds near the transducer prevents the ultrasonic wave propagation to the medium.

The distribution of cavitational events throughout the reactor volume is an important parameter that is determined by the reactor geometry and transducer locations/array, signal type (continuous or pulse or sweep), sonoreactor size/shape/material, reflector locations/material (if any), artificial or intrinsic (acoustic/quasi acoustic streaming) flow, and irradiation distance. Thus, these geometric and transducer parameters play an important role in determining the effectiveness of the sonochemical reactor. A flow-through sonochemical reactor can decrease energy consumption (Watt $L^{-1}$); in other words, it can increase the reaction rate compared to the batch reactor. It has been reported that sonochemical efficiencies in multifrequency transducer conditions can be significantly higher than those in single-frequency transducer conditions. However, these parameters have to be thoroughly investigated for both the design of lab-scale reactors as well as large-scale industrial sonochemical reactors to achieve uniform cavitational activity. This can ensure that the maximum utilization of cavitational intensity can be achieved. Such optimization can minimize process costs and enhances the acceptability of sonochemical reactors for commercial applications.

The sonolytic process, as driven by the propagating acoustic wave in water at frequencies ranging from 200 KHz to 1000 kHz, is shown to be both an effective and relatively fast method for the mineralization of PFOS and PFOA. However, as mentioned earlier, this technology has a high energy demand and is generally not applicable to high volume, rapid flow rate applications common to water treatments (e.g., groundwater and drinking water). Rather, as described herein, the current field-scale treatment of PFAS-impacted liquids is typically limited to sequestration technologies (e.g., GAC and IX), which are interim actions that generate concentrated waste streams requiring further processing. There appears to be no single viable technology that is effective for the removal and destruction of all short and long-chain PFAAs in water treatment applications.

The diverse principles of sonochemistry associated with power ultrasound are used in accordance with embodiments of the present disclosure to develop new and cost-effective treatment methods and systems to destroy PFAS in concentrated waste streams. The effect of solution and contaminant factors, such as type of sparge gas, initial concentration of PFAS, presence of co-contaminant, and pH have been previously investigated. However, the impact of ultrasonic parameters such as frequency, power density, residence time and reactor geometric on sonolytic degradation of the PFAAs is not well understood. It is important to evaluate such ultrasonic parameters to optimize the sonolytic decomposition of PFAS in high-concentration waste streams, to provide cost-competitive and environmentally sustainable on-site remedial methods and systems.

SUMMARY

In accordance with embodiments of the present disclosure, methods and systems for treating fluorinated compounds (more specifically, per- and polyfluorinated compounds) in the effluent of PFAS waste streams using high-frequency ultrasound are disclosed.

In accordance with embodiments of the present disclosure, a sonochemical reactor system for destroying or mineralizing per- and polyfluoroalkyl substances (PFAS) in a waste stream is disclosed. The reactor system includes one or more reactors defining one or more chambers for receiving the waste stream and walls defined by the one or more chambers or one or more baffles disposed in the one or more chambers. The reactor system also includes transducers disposed in the one or more chambers. The transducers are disposed on the walls and are operable to induce cavitation in the waste stream to destroy or mineralize the per- and polyfluoroalkyl substances (PFAS) in the waste stream. The reactor system further includes reactor stages, wherein each of the reactor stages includes a subset of the transducers. Each subset of transducers includes at least one pair of the transducers, wherein the at least one pair of the transducers is opposingly or adjacently spaced.

In accordance with embodiments of the present disclosure, the subset of the transducers in each of the stages can operate at a different frequency.

In accordance with embodiments of the present disclosure, the subset of transducers in a first one of the stages can be operable to destroy or mineralize at least a first type of per- and polyfluoroalkyl substances (PFAS) and the subset of transducers in a second one of the stages can be operable to destroy or mineralize at least one of the first type or a different type of per- and polyfluoroalkyl substances (PFAS).

In accordance with embodiments of the present disclosure, the plurality of transducers operate in any range between 200 kHz to 1 MHz.

In accordance with embodiments of the present disclosure, one or more reactors can be a flow-type sonochemical reactor that includes the baffles to define the stages of the reactor system. The baffles can define a sinuous path through the flow-type reactor, wherein the waste stream flows through the flow-type reactor along the sinuous path.

In accordance with embodiments of the present disclosure, the flow-through flow-type sonochemical reactor can have two or more baffles for directing the flow of the waste stream. In one embodiment, transducers that operate different frequencies can be attached to the opposite sides of the baffles. The width of rows or channels defined by the baffles can be specified based on the frequency of the transducer attached to the baffle in each row or channel.

In accordance with embodiments of the present disclosure, the flow-type sonochemical reactor can include a fluid inlet to an interior volume of the flow-type sonochemical reactor; a first baffle of the one or more baffles attached to a first reaction chamber wall; a second baffle one of the baffles attached to a second reaction chamber wall; and a third baffle one of the baffles attached to the first reaction chamber wall, wherein the waste stream can be received via the fluid inlet and can be directed to the first baffle. The first, second, and third baffles can be configured such that the waste stream is directed in a sinuous path from the first baffle to the second baffle and from the second baffle to the third baffle. The flow-type reactor can also include a first transducer attached to a front face of the first baffle; a second transducer attached to a rear face of the first baffle; a third transducer attached to a front face of the second baffle; a fourth transducer attached to a rear face of the second baffle; a fifth transducer attached to a front face of the third baffle; a sixth transducer attached to a rear face of the third baffle; and a fluid outlet through which a treated stream can be discharged from the interior volume. In accordance with embodiments of the present disclosure, the baffles (e.g., first through third baffles) can include one, two, three or more transducers on the front and/or rear faces.

In accordance with embodiments of the present disclosure, the sonochemical reactor system can have a modular configuration, wherein the stages can be formed by several reactors that are operably coupled to each other. The modular configuration can form a semi-continuous or continuous flow-through reactor for destruction or mineralization of per- and polyfluoroalkyl substances (PFAS) in complex chemical waste streams. As one example, at least one of the reactors in the modular configuration can be a batch reactor or a flow-type sonochemical reactor. In a non-limiting example, a modular configuration for a continuous flow-through reactor system can include a series of interconnected flow-type sonochemical reactors. In another non-limiting example, a modular configuration for a semi-continuous flow-through reactor system can include a series of interconnected reactors, including at least one batch where the waste stream can pass through the series of reactors. For example, at least one of the stages can be formed by a batch reactor that includes interior faces with a first face along a first reaction chamber wall and a second face along a second reaction chamber wall. The subset of the transducers in the batch reactor can include a first transducer attached to the first face and a second transducer attached to the second face wherein the first transducer and the second transducer are facing each other. At least one of the first transducer or the second transducer of the batch reactor can be a plate transducer. The batch reactor can further include a third face along a third reaction chamber wall; a fourth face along a fourth reaction chamber wall; a third transducer attached to the third face; and a fourth transducer attached to the fourth face, wherein the third transducer and the fourth transducer can be facing each other.

In accordance with embodiments of the present disclosure, the modular configuration can include a first reactor set having a first reactor in series with a second reactor in series with a third reactor, and a second reactor set in parallel with the first reactor set, the second reactor set comprising a fourth reactor in series with a fifth reactor in series with a sixth reactor. A first exit stream from the first reactor can be output to the fifth reactor, a first exit stream from the fourth reactor can be output to the second reactor, a first exit stream from the second reactor can be output to the sixth reactor, and a first exit stream from the fifth reactor can be output to the third reactor. The modular configuration can further include a third reactor set in parallel with the first reactor set and the second reactor set, wherein the third reactor set includes a seventh reactor in series with an eighth reactor in series with a ninth reactor. A second exit stream from the first reactor can be output to the eighth reactor, a second exit stream from the fourth reactor can be output to the eighth reactor, a second exit stream from the second reactor can be output to the ninth reactor, a second exit stream from the fifth reactor can be output to the ninth reactor, a first exit stream from the seventh reactor can be output to the second reactor, a second exit stream can be output from the seventh reactor to the fifth reactor, a first exit stream from the eighth reactor can be output to the third reactor, and a second exit stream from the eighth reactor can be output to the sixth reactor. An exit stream from the third reactor, an exit stream from the sixth reactor, and an exit stream from the ninth reactor can be combined as a final exit stream from the modular reactor.

In accordance with embodiments of the present disclosure, at least one of the stages of the modular configuration can be formed by a flow-type sonochemical reactor described herein.

In accordance with embodiments of the present disclosure, the transducers can be disposed on at least one of opposite or adjacent walls or bottom one of the side walls of the flow-through reactors and/or the batch reactors described herein.

In accordance with embodiments of the present disclosure, argon gas can be introduced into the reactor system. In one embodiment, argon can be purged in the form of nanobubbles to increase its dissolution in liquid. In one embodiment, the catalysts or additives such as persulfate and sulfate ions can be added to the system to enhance the reaction and cause complete mineralization.

In accordance with embodiments of the present disclosure, the reactor system can operate in a variety of effluents provided a concentration of the contaminant is at least 10 PPB is present. The effluent can be diluted to control the contaminated concentration as necessary. Besides fluorinated organic compounds, other organic compounds that contribute to TOC (total organic carbon) can also be treated.

In accordance with embodiments of the present disclosure, a method is disclosed that includes receiving a waste stream including per- and polyfluoroalkyl substances (PFAS) via an inlet to a reactor system including one or more reactors with transducers being disposed in the one or more reactors; operating a first subset of the transducers at a first frequency, wherein the first subset of transducers including a first pair of the plurality of transducers; and operating a second subset of the plurality of transducers at a second frequency, wherein the second subset of transducers includes a second pair of the transducers. The first subset of the transducers operate at the first frequency and the second subset of the transducers can operate at the second frequency to destroy or mineralizes the per- and polyfluoroalkyl substances (PFAS) in the waste stream using sonolysis.

In accordance with embodiment of the present disclosure, the method can also include introducing a catalyst to increase the rate of sonolytic degradation and decrease power consumption, the catalyst comprising persulfate and sulfate ions and others deemed suitable.

In accordance with embodiment of the present disclosure, the method can also include introducing an additive to increase the rate of sonolytic degradation and decrease power consumption, the additive comprising of sodium chloride.

In accordance with embodiment of the present disclosure, the method can also include introducing Argon gas in the form of nanobubbles to increase the rate of sonolytic degradation and decrease power consumption.

In accordance with embodiment of the present disclosure, the first subset of the transducers can include a first pair of transducers that are facing each other and the second subset of the transducers can include a second pair of transducers that are facing each other.

Any combination and/or permutation of the embodiments are envisioned. Other objects and features will become apparent from the following detailed description considered in conjunction with the accompanying drawings. It is to be understood, however, that the drawings are designed as an illustration only and not as a definition of the limits of the present disclosure.

BRIEF DESCRIPTION OF THE DRAWINGS

To assist those of skill in the art in making and using the disclosed ultrasonic system and method, reference is made to the accompanying figures, wherein.

DETAILED DESCRIPTION

Embodiments of the present disclosure include systems and methods to destroy fluorinated compounds more specifically, per- and polyfluorinated compounds in effluent of waste streams using high-frequency ultrasound. Even though the sonolytic process can be used to directly treat PFAS impacted water streams effluent, the huge volume of most contaminated water stream effluents makes the use of most high-frequency ultrasound unsustainable. The present disclosure provides a more efficient system to mineralize PFAS waste resulting from conventional sequestration treatment technologies such as ion exchange resins, reverse osmosis, nanofiltration and foam fractionation. Thereafter the high-frequency ultrasound system can be used to reduce the more concentrated pollutant level in the waste stream generated from sequestration treatment approaches. Aside from the various illustrative embodiments described herein, other embodiments are contemplated and are capable of being practiced or being carried out by other ways than those described herein. Thus, it is to be understood that the present disclosure is not limited in its application to the details of construction and the arrangements of components set forth in the following description or illustrated in the drawings.

As used herein, a "waste stream" refers to water contaminated with at least one pollutant that is or will be subject to a water treatment process. As an example, a waste stream can be water contaminated with PFAS that is or will be subject to a sonolytic process, which can be performed after the waste stream has been processed by other water treatment processes or can be performed without requiring the waste stream to be first treated by other water treatment processes. Non-limiting examples of other water treatment processes that can be utilized before a sonolytic process can include one or more sequestration treatment technologies such as, but not limited to, granular activated carbon (GAC), ion exchange resins (IX), reverse osmosis, nanofiltration and/or foam fractionation.

Figure 1A:
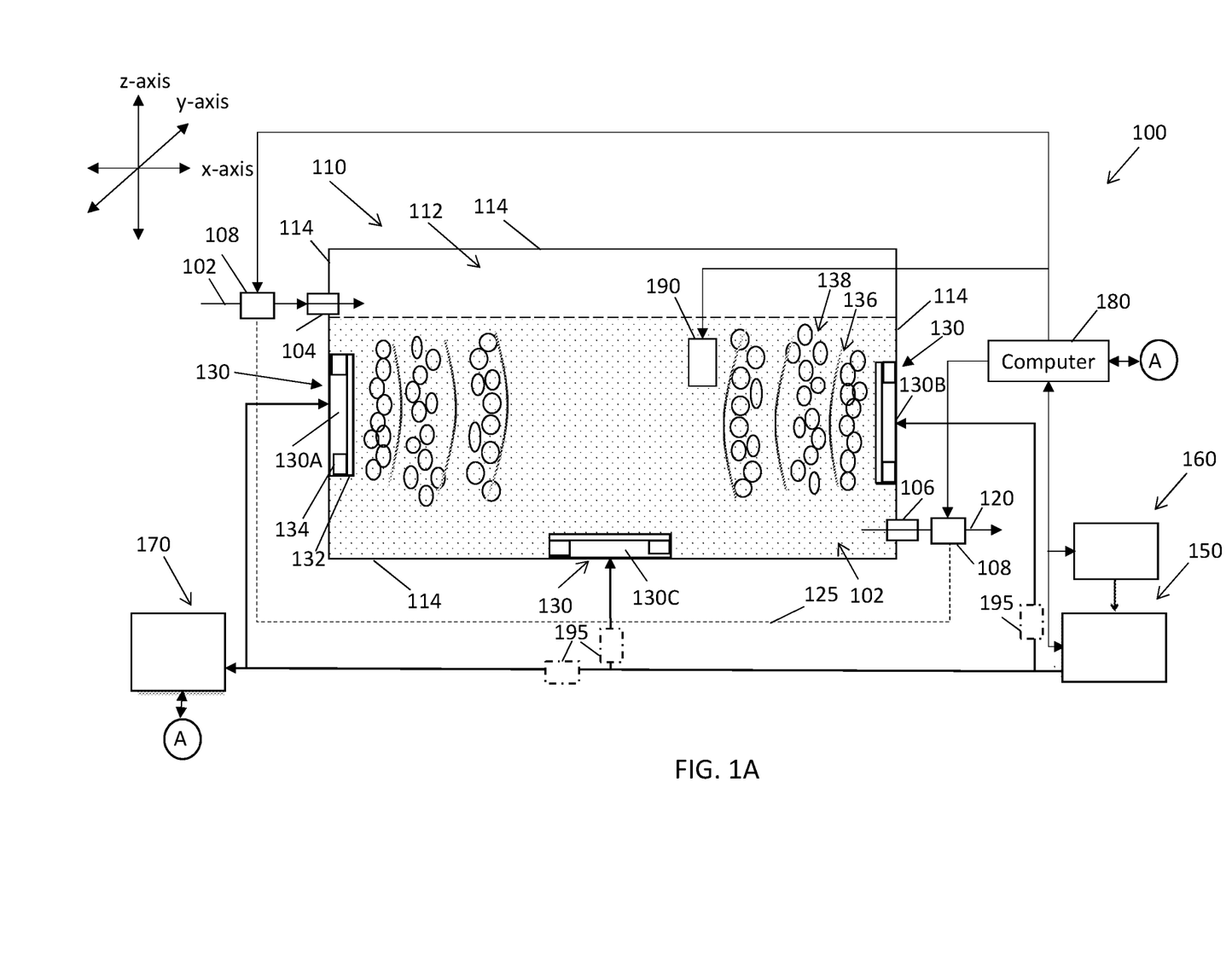
FIGS. 1A-C illustrates schematic views of example batch reactors to generate acoustic cavitation, in accordance with one embodiment of the present disclosure.
Figure 1B:
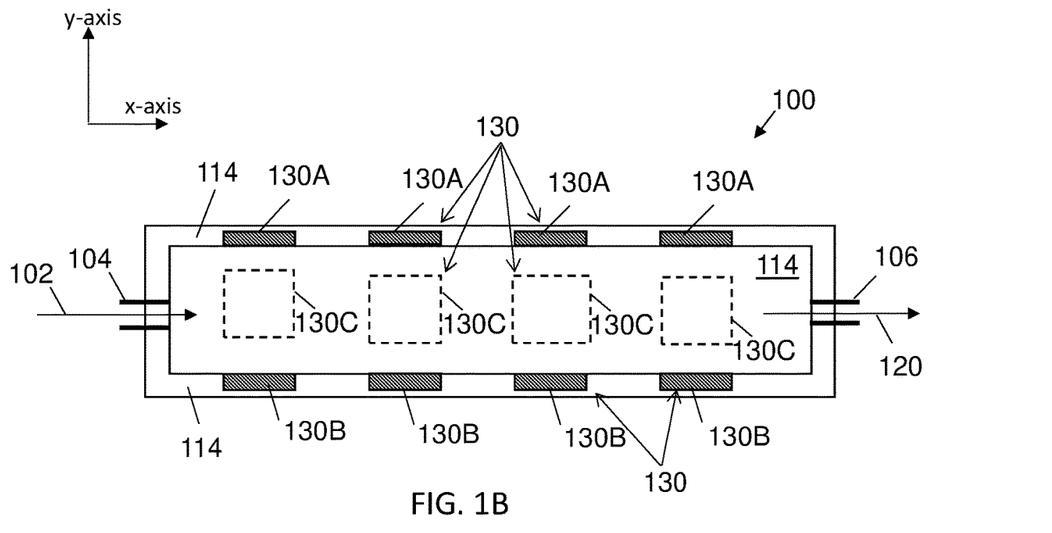
Figure 1C:
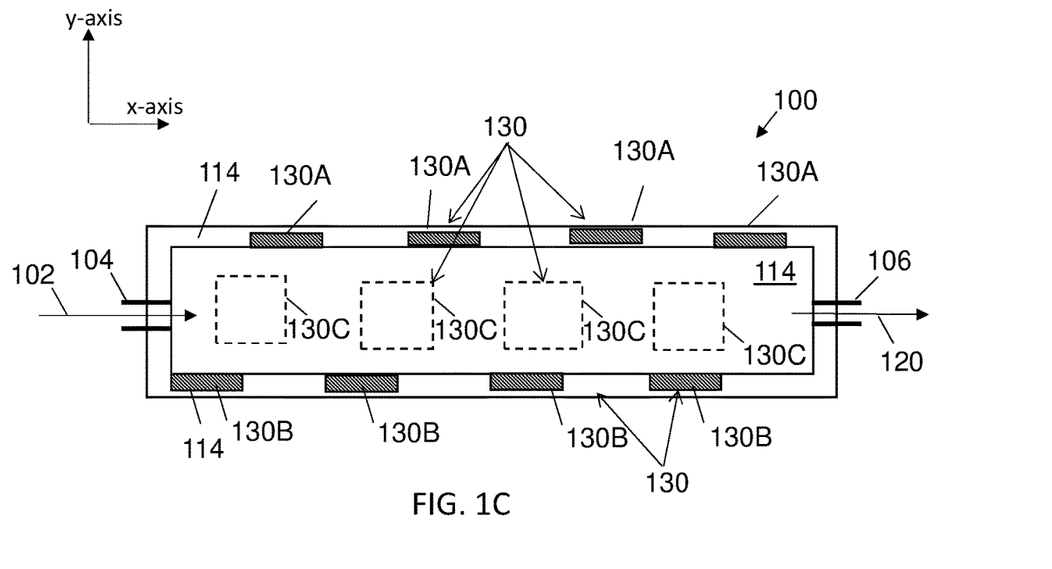

FIGS. 1A-C are schematic views of an example batch reactor 100 configured and dimensioned to remediate, degrade, and/or remove PFAS pollutants in a waste stream 102 in accordance with example embodiments of the present disclosure. As a non-limiting example, the concentration of PFAS in the waste stream 102 can be within a range of about 0.25 ng/mL to about 106 ng/mL (1000 mg/L). The waste stream 102 can be received by the batch reactor 100 after the waste stream 102 has been processed by one or more other water treatment technologies or can be performed without requiring the waste stream 102 to be first treated by other water treatment technologies. For example, in one embodiment, the waste stream 102 can first be treated using one or more sequestration treatment technologies such as, but not limited to, granular activated carbon (GAC), ion exchange resins (IX), reverse osmosis, nanofiltration and/or foam fractionation before the waste stream 102 is received and processed by the batch reactor 100. The batch reactor 100 includes a sonochemical reactor having a chamber 110 that includes an interior volume 112 defined by chamber walls 114 for receiving a waste stream 102. The chamber 110 can have a specified length measured along the x-axis, a specified width measured along the y-axis, and a specified height measured along the z-axis. The stream 102 can be input to the reactor 100 via an inlet 104 formed in the chamber 110 to fill the interior volume with a specified volume of the waste stream 102 and the treated stream 120 can be output from the chamber 110 via an outlet 106, where some, all, or none of the treated stream can be recirculated back into the chamber via the inlet 104 as a recirculated stream 125 to create a feedback loop. Pumps 108 can control a flow of the waste stream 102 into the chamber 110 of the reactor 100 and can control a flow of the treated stream 120 and/or recirculated stream 125 out of the chamber 110 of the reactor 100. The batch reactor 100 further includes one or more ultrasonic devices in the form of plate transducers 130 (e.g., a first plate transducer 130A, a second plate transducer 130B, and/or a third plate transducer 130C in FIG. 1A). The ultrasonic transducers can operate to remediate, degrade, and/or remove PFAS from waste stream.

The plate transducers 130 can be positioned in the interior volume 112 along one or more interior faces of the walls 114 of chamber 110 and can include a vibrating plate 132 and one or more piezoceramic plates 134. The plate transducers 130 can be disposed on the end walls of the chamber 110 oriented to be parallel to the y-axis as shown in FIG. 1A such that a planar surface of the vibrating plates 132 of each of the plate transducers 130 faces toward the interior volume 112. The plate transducers 130 can also be disposed on the sidewalls of the chamber 110 oriented to be parallel to the x-axis as shown in FIGS. 1B-C such that a planar surface of the vibrating plates 132 of each of the plate transducers 130 faces toward the interior volume 112. In one exemplary arrangement, a pair of the plate transducers 130 (a pair of transducers 130A and 130B) can be opposingly spaced from, and facing, each other, e.g., a shown in FIGS. 1A and 1B. In one exemplary arrangement, a first subset of the plate transducers 130 (transducers 130A) can be disposed on one of the side wall and a second subset of the plate transducers 130 (transducers 130B) can be disposed on an opposite one of the side wall, where the first subset of transducers 130 and the second subset of transducers can be offset or staggered from each other along the length of the chamber (along the x-axis), e.g., as shown in FIG. 1C. The transducers 130 (transducers 130C) can be disposed along a bottom one of the side walls 114 in addition, or in the alternative, to being disposed on one or more of the other side walls 114 of the chamber 110 such that the transducers 130 can be disposed on adjacent and/or opposite side wall 114. The transducers 130C on the bottom side wall can be aligned along the length (x-axis) of the chamber 110 with the transducers 130A and/or 130B disposed on one or more of the adjacent walls, e.g., as shown in FIG. 1B, or can be offset or staggered with respect to the transducers 130A and/or 130B along the length (x-axis) of the chamber 110, e.g., as shown in FIG. 1C.

The plate transducers 130 can operate at a frequency to emit ultrasonic waves 136 into the interior volume 112 of the chamber 110 generally along an x-axis. As an example, the frequency at which the plate transducers 130 can operate can be on the order of hundreds of kilohertz (e.g., approximately 100 kHz to approximately 1.2 MHz). In exemplary embodiments, the frequency can be approximately in a range of about 200 kHz to about 1.1 MHz, or can operate a frequency of 200 KHz, 330 kHz, 450 kHz, or any other suitable frequency within the range. An acoustic amplitude of the ultrasonic waves 136 emitted by the plate transducers 130 and an ultrasonic energy from the plate transducers 130 can be transferred to waste stream in the interior volume 112. The ultrasonic energy in the waste stream 102 from the plate transducers 130 can result in cavitation, which causes bubbles 138 to form and collapse in the waste stream 102. The bubbles 138 formed by the plate transducers 130 can be well distributed throughout the waste stream. The cavitation produced by the plate transducers 130 can initiate, via oxidation by free radicals and pyrolysis, sonochemical degradation of the PFAS in the waste stream 102.

The plate transducers 130 can be operable coupled to a power amplifier 150. The power amplifier 150 can operate to energize the plate transducers 130 to emit the ultrasonic waves 136. A signal generator 160 can be operable coupled to the power amplifier 150 to control the output of the power amplifier 150 based on a signal output by the signal generator 160. As an example, the signal generator can output a static or constant signal and the power amplifier 150 can output a fixed voltage or current output. As another example, the signal generator 160 can output a time-varying signal (e.g., a square wave, a sine wave, a sawtooth wave, pulse width modulated signal, etc.), and the power amplifier 150 can output a voltage or current corresponding to the time-varying signal. An oscilloscope 170 can be used to monitor the output of the power amplifier 150 in response to the signal output from the signal generator 160.

In some embodiments, the pumps 108, the power amplifier 150, signal generator 160, and/or oscilloscope 170 can be operatively coupled to a computer 180. The computer 180 can control the operation of the power amplifier 150, the signal generator 160, and/or the oscilloscope 170. For example, the computer 180 can be programmed to adjust parameters on the pumps 108, the signal generator 160, and/or oscilloscope 170 to facilitate remediation, degradation, and/or removal of the PFAS from the waste stream 102.

In some embodiments, one or more sensors 190 can be included in the system to measure contaminants in the chamber 110. The sensors 190 can output sensed data to the computer 180, and the computer 180 can use the sensed data to monitor an operation of the system 100 to determine whether PFAS pollutant has been remediated to a sufficient level and/or can use the sensed data as feedback to dynamically adjust an operation of the system (e.g., to determine whether to energize or de-energize the plate transducer).

In an exemplary operation of an embodiment of the batch reactor 100, switches 195 can be controlled by the computer 180 to selectively control the plate transducers 130, via an output of the power amplifier 150, to vibrate sequentially, simultaneously, and/or according to one or more specified patterns. The output of the power amplifier 150 and signal generator 160 can be controlled by the computer 180 executing a treatment application and/or can be independently controlled via their respective user interfaces. In some embodiments, a separate power amplifier 150 and signal generator 160 can be used to control each plate transducer 130 so that the plate transducers can be independently controlled without switches 195.

An array or sequence of two or more of the batch reactors 100 can be used to form a semi-continuous flow through a sonochemical reactor. To establish the semi-continuous flow through sonochemical reactor, an instance of the batch reactor 100 can be used to evaluate the effect of frequency, power density, residence time, and transducer position parameters on the sonolytic decomposition of PFAS. This testing can be used to optimize the system parameters (frequency, power density) and design the geometric parameter and transducer positing for the modular flow-through reactor design, as described herein.

While an exemplary embodiment of the batch reactors for remediating, degrading, and/or removing PFAS from waste streams is illustrated with respect to FIGS. 1A-C exemplary embodiments of the system can vary. As one example, embodiments of the system for remediating waste streams can include different quantities and/or types of ultrasound transducers which can be disposed in the chamber in different arrangements, positions, and/or orientation. As another example, one or more of the plate transducers can operate at a different or identical frequency as the other plate transducers. As another example, in addition to, or in the alternative of, the plate transducers, exemplary embodiments can include piezoelectric transducers or magnetostrictive transducers. Likewise, although two piezoceramic plates 134 are shown for each transducer 130, the quantity of piezoceramic plates can vary, e.g., can be greater than or less than two. The reactor can employ the sensors 190 and/or other condition detection and control subsystems or components that can be included to process at a particular rate or at a particular scale. In one embodiment, the reactor can employ the use of argon gas as nanobubbles to increase the rate of sonolytic degradation and reduce power consumption. In addition, or alternatively, the reactor can employ the use of catalysts and additives such as persulfate and sulfate ions as additives to enhance the reaction and cause complete mineralization. The liquid in the reactor is preferably recirculated to distribute the cavitational bubbles.

In the embodiment shown in FIGS. 1A-C, a first plate transducer 130A is positioned along a sidewall of the chamber 110, a second plate transducer 130B is positioned along the opposite sidewall of the chamber 110, and the third plate transducer 130C is position along a bottom side wall adjacent to side walls upon which the transducers 130A and 130B are disposed. The spacing between the first plate transducer 130A and the second plate transducer 130B measured parallel to the y-axis can be in any range from about 5 cm to about 50 cm. It will be understood that the position of the plate transducers 130 in the chamber 110 can vary. For example, the plate transducers 130 can be positioned horizontally, vertically, or at any inclination.

In one embodiment, the first plate transducer 130A, the second plate transducer 130B, and/or the third plate transducer 130C can have the same resonant frequency. In another embodiment, the first plate transducer 130A, the second plate transducer 130B, and/or the third plate transducer 130C can have different resonance frequencies. The first plate transducer 130A, the second plate transducer 130B, and/or the third plate transducer 130C can have resonant frequencies in any range from about 200 kHz to about 1 MHz. It will be understood that the plate transducers 130 can operate at another frequency.

In one embodiment, the first plate transducer 130A, the second plate transducer 130B, and/or the third plate transducer 130C can vibrate simultaneously. In another embodiment, acoustic cavitation can be generated in multiple steps. In particular, as a non-limiting example, the first plate transducer 130A is initially operated for another predetermined period of time, such as 5 minutes, then the second plate transducer 130B is operated for a predetermined period of time, such as 5 minutes, and/or then the third plate transducer 130C is operated for a predetermined period of time, such as 5 minutes, although the sequence and period of operation of the transducers 130A, 130B, and/or 130C can vary in accordance with embodiments of the present disclosure.

The reactor shown in FIGS. 1A-B with a first transducer plate(s) 130A and a second transducer plate(s) 130B at a predetermined separation distance can create standing waves with high and low energy intensity points. In one embodiment, the reactor can include two pairs of transducers 130 facing each other operating at the same frequency producing standing waves in the X-direction and another in the Y-direction. In another embodiment, the reactor can include two pairs of transducers 130 facing each other operating at different frequencies producing standing waves in the X-direction and another in the Y-direction.

While an example illustrative embodiment is described herein with reference to the use of specific compounds and materials, it is understood that the present disclosure can employ other suitable compounds or materials. Similar quantities or measurements may be substituted without altering the systems and methods described herein.

The number and type of PFAS that can be reliably quantified are limited to the ever-growing list of commercially available analytical standards, and there are no proven and demonstrated analytical technologies to detect all potential fluoro-organic byproducts. Due to the limitations of Liquid Chromatography-Mass Spectrometry (LC-MS) in the detection of potential byproducts, several methods can be used across all experiments to determine the degree of mineralization. Mass balances can be performed using known and quantifiable PFAS (LC-MS technique) and release of fluoride (Ion Selective Electrode (ISE) technique) to demonstrate PFAS mineralization. The concentrations of released sulfate and fluoride using an ion chromatography technique and total organic carbon (TOC) can be used to demonstrate that there are no byproducts and there complete mineralization of PFAS. The Nuclear Magnetic Resonance (NMR) technique and total organic fluorine (TOF) by combustion ion chromatography (CIC) can be used as complementary analytical tools to the LC-MS to determine the presence of organo-fluorine compounds, which can be compared with the fluoride analyses to show and fluorine mass balance.

The orientation of transducers (on the side or at the bottom) within the chamber 110 of an embodiment of the reactor 100, number of transducers 130 (two on opposite sides or one in each direction) and the geometry of an embodiment of the reactor 100 (length (L), width (W) and liquid height (D)) can be selected. In one embodiments, the transducers 130 can be disposed along sidewalls of the reactor chamber 110 along a length of the chamber between the inlet and the outlet. The reactor length and liquid height values can be varied to obtain optimal mineralization of PFAS for a first selected test frequency. Then, the second transducer can be installed on the other direction to determine an optimal width (W) to obtain the maximum mineralization of PFAS in an embodiment of the batch reactor 100.

The circulation in the reactor 100 can move/stir micro-nano bubbles generated by ultrasound for uniform degradation of PFAS. The effect of liquid flow can also be taken into consideration to design flow-type sonochemical reactors. To minimize the impact of the acoustic power, a standard power density of 150 or 200 Watt/liter can be used in the examples of the reactor 100.

In large-scale operations, the use of a batch-reactor can be limited, and for on-site treatment, a continuous flow-type reactor can be essential. The reactor geometry and the arrangement of the transducers 130 are important parameters to achieve uniform distribution of cavitational events throughout the reactor volume. Thus, in addition to the regular parameters such as frequency and intensity of irradiation, the essential design parameters for the continuous flow sonochemical reactors are the distance between the transducer and the number of transducers.

Figure 2A:
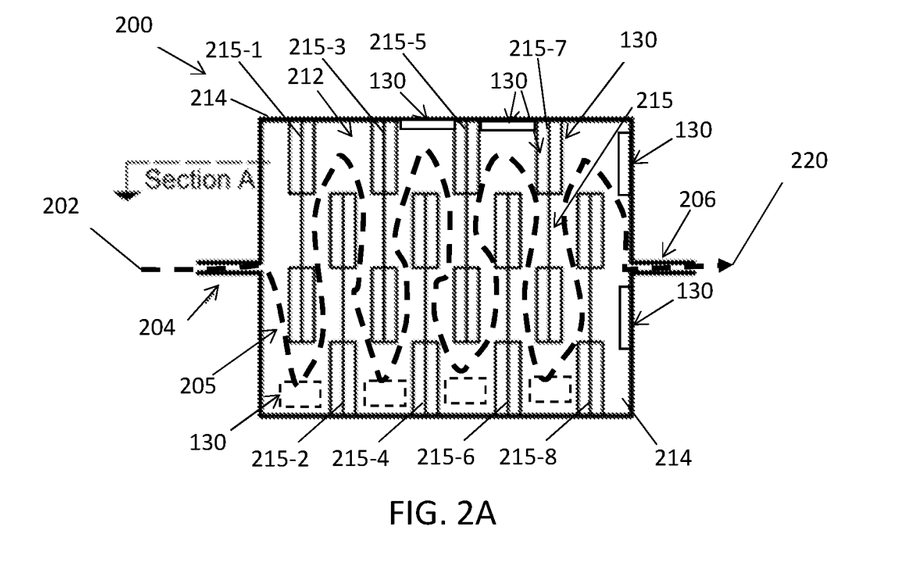
FIG. 2A is a schematic plan view of a flow-through reactor in accordance with one embodiment of the present disclosure.
Figure 2B:
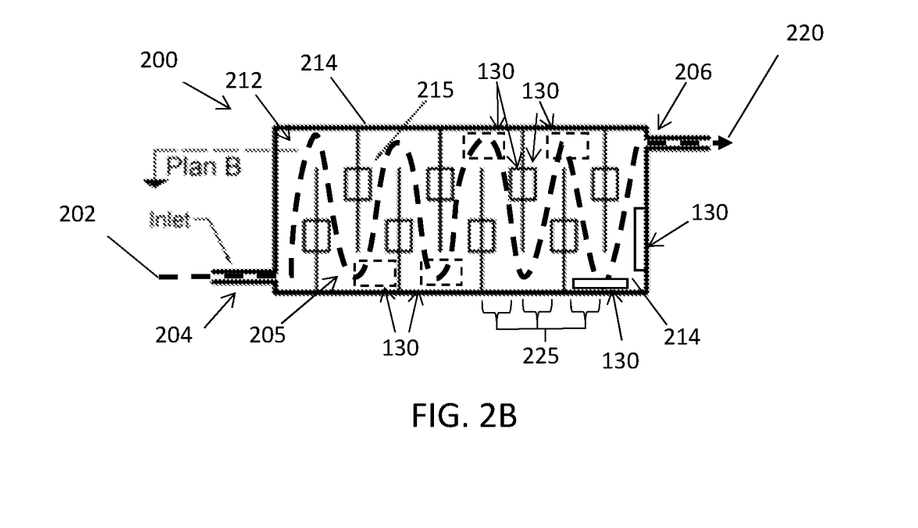
FIG. 2B is a schematic cross-sectional view of a flow-through reactor taken along a Section A in FIG. 2A in accordance with one embodiment of the present disclosure.

FIGS. 2A and 2B are schematic views of an example embodiment of a flow-type sonochemical reactor 200 for on-site treatment of PFAS in the waste stream 202. The reactor 200 can be a standalone system or can used in a modular reactor system that is operative to remediate, degrade, and/or remove the PFAS from the waste stream 202. The waste stream 202 can be received by the flow-type sonochemical reactor 200 after the waste stream 202 has been processed by one or more other water treatment technologies or can be performed without requiring the waste stream 202 to be first treated by other water treatment technologies. For example, in one embodiment, the waste stream 202 can first be treated using one or more sequestration treatment technologies such as, but not limited to, granular activated carbon (GAC), ion exchange resins (IX), reverse osmosis, nanofiltration and/or foam fractionation before the waste stream 202 is received and processed by the flow-type sonochemical reactor 200. The reactor 200 can include a chamber 210, including an interior volume 212 defined by walls 214 for receiving the contaminated waste stream 202. The chamber 210 can have a specified length, width, and height. The contaminated waste stream 202 can be input to the reactor 200 via an inlet 204 formed in the chamber 210 and the treated stream 220 can be output from the chamber 210 via an outlet 206. Pumps, such as pumps 108 shown in FIG. 1A, disposed at the inlet 204 and/or outlet 206 can control a flow of the contaminated waste stream 202 into the chamber 210 of the reactor 200 and can control a flow of the treated stream 220. The reactor 200 further includes one or more baffles or interior walls 215 and the ultrasonic devices in the form of the plate transducers 130. The ultrasonic transducers can operate to remediate, degrade, and/or remove PFAS from the contaminated waste stream 202.

The baffles 215 can define one or more channels or rows in the interior volume 212 of the chamber 210 of the reactor 200 and are provided to direct the waste stream flow along a specified path 205 through the channel(s). The channels or rows can be formed by the baffles 215 and can define different stages 225 of remediation, degradation, and/or removal of the PFAS from the contaminated waste stream 202. In the present example embodiment, the baffles 215 can define a sinuous, serpentine, or tortuous configuration for the path 205, although the path 205 can be defined to have different configurations. The plate transducers 130 can be disposed on the baffles 215 and/or walls 214 (e.g., one or more of the side walls 114 including, for example, the bottom side wall) along the long channel. Example positions of the transducers 130 are shown in FIGS. 2A-B and some example transducer positions have been omitted in the different views shown in FIGS. 2A-B for clarity. The reactor 200 can include two or more baffles 215 to accommodate a specified flow rate and residence time requirements. The plate transducers 130 can be configured to operate at the same or different frequencies. For example, several of the plate transducers 130 operating at a first frequency can be attached to one side of one of the baffle walls 215 and several plate transducers 130 operating at a second frequency can be attached to the other side of the baffle wall 215. The waste stream 202 can pass by several baffles 215, which include ultrasonic transducers (e.g., plate transducers 130) which can initiate the acoustic cavitation in the reactor 200. These cavitations can induce the mineralization of PFAS in the waste stream 202. After the treatment, the treated waste stream 220 can exit from the outlet 206 for the discharge. This reactor 200 includes a series of baffles 215. The flow direction and the orientation of the inlet 204 and the outlet 206 can vary. In one embodiment, each row 225 can have transducers vibrating at different resonating frequencies.

In one embodiment, two optimum frequencies are provided, as two frequencies can have a synergistic effect due to the energy required for mineralization of both short and long-chain PFAS and orientation of transducers along the baffles 215. In this embodiment. Separate channels or rows (e.g., stages 225) are provided for each frequency. The width of the channels or rows 225 can be adjusted accordingly based on the frequency. Thus, channels or rows with different transducer frequencies can have different widths, and, to maintain the flow rate, the depth of channels or rows can be adjusted. The effect of power density (watt per liter), and the transducer position can be examined. The observed reaction rates for degradation of the contaminant in a pilot station can be compared with values determined under similar conditions used for the batch reactor 100 to evaluate the performance over a wide range of power densities.

In one embodiment, argon gas can be used in the form of nanobubbles to achieve a preferred residence time. In one embodiment, use of argon gas or other similar gas can be introduced into the system in the form of nanobubbles to increase its dissolution in water. In one embodiment, the use of catalysts or additives such as persulfate and sulfate ions can be included to enhance the reaction and cause complete defluorination.

The reactor 200 can include similar components as the reactor 100, which have not been replicated in FIGS. 2A-B for clarity. As an example, the reactor 200 can include the pumps 108 at the inlet 204 and outlet 206, the power amplifier 150 and the signal generator 160 for controlling the plate transducers 130, the oscilloscope 170 for monitoring the signal output by the power amplifier 150, the sensors 190 to monitor the contaminated waste stream 202, the switches 195, and the computer 108 can control the pumps, the power amplifier(s), the signal generator(s), the oscilloscope(s), the sensors, and the switches in a manner described herein with reference to FIG. 1A. In one embodiment, each row 225 of the transducers 130 can be operated by a separate power amplifier and a separate signal generator.

In the present example shown in FIGS. 2A-B, first, third, fifth, and seventh baffles 215-1, 215-3, 215-5, and 215-7 can be attached to and project from one of the chamber walls 214 into the interior volume 212, and second, fourth, sixth, and eighth baffle 215-2, 215-4, 215-6, 216-8 can be attached to and project from another one of the chamber walls 214 (e.g., an opposite wall). The waste stream can be received via the fluid inlet 204 and initially directed to the first baffle 215-1, after which the waste stream flows around the first through eighth baffles 215-1 to 215-8, which are configured to direct the waste stream 202 a sinuous path from the first baffle to the second to the third baffle and so on until the treated stream 220 is discharged from the outlet 206 after passing the eighth baffle 215-8. A first one of the transducers 130 can be attached to a front face of the first baffle 215-1 to face towards the inlet 204, a second one of the transducers 130 can be attached to a rear face of the first baffle 215-1 to face away from the inlet 204, a third one of the transducers 130 can be attached to a front face of the second baffle to face towards the second one of the transducers 130, a fourth one of the transducers 130 can be attached to a rear face of the second baffle to face in the opposite direction relative to the third one of the transducers 130, a fifth one of the transducers 130 can be attached to a front face of the third baffle to face towards the fourth one of the transducers 130, a sixth one of the transducers 130 can be attached to a rear face of the third baffle to face in the opposite direction relative to the fifth one of the transducers 130, and so on. Additional transducers can be attached to the baffles. As a non-limiting example, as shown in FIG. 2A, two transducers can be attached to the front and rear faces of the baffles 215. While FIG. 2A illustrates an embodiment that include two transducers on the front side of the baffles 215 and two transducers on the rear side of the baffles 215, embodiments of the present disclosure can include fewer or more transducers attached the front side and/or rear side of the baffles 215. For example, one, two, three, or more transducers can be attached to the front side and/or the rear side of the baffles.

Figure 3:
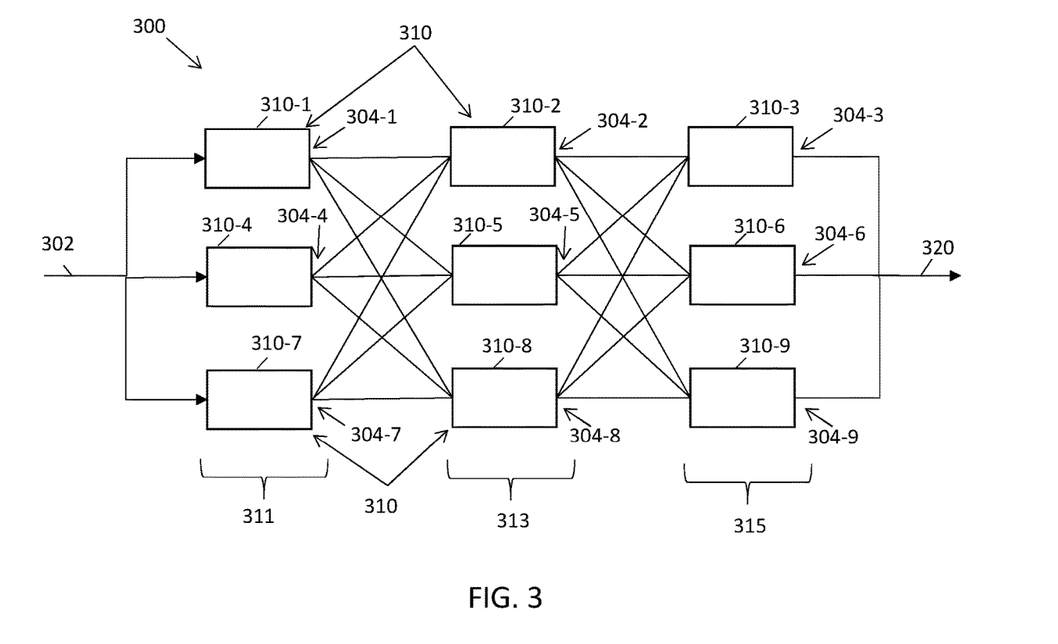
FIG. 3 illustrates a schematic of a sonochemical field reactor to treat a complex mixture of PFAS contaminated waste stream consisting of several batch reactors operating in different optimized frequencies.

FIG. 3 is a schematic view of one embodiment of a modular multi-stage flow through sonochemical reactor system 300 for on-site treatment of a complex mixture of PFAS contaminated waste stream 302, including several reactors 310 operating at one or more frequencies corresponding to PFAS chemicals found in the waste stream 302. The waste stream 302 can be received by the reactor system 300 after the waste stream 302 has been processed by one or more other water treatment technologies or can be received by the reactor system 300 without first being treated by other water treatment technologies. For example, in one embodiment, the waste stream 302 can first be treated using one or more sequestration treatment technologies such as, but not limited to, ion exchange resins, reverse osmosis, nanofiltration and/or foam fractionation before the waste stream 302 is received and processed by the batch reactor 300. The waste stream 302 can pass through a series of interconnected reactors 310. The waste stream 302, containing a complex mixture of PFAS, enters from an inlet 304 to the reactor system 300. The waste stream 302 can pass through a series of interconnected reactors 310 as shown, for example, in FIG. 3, with different frequencies for each PFAS chemical. After the treatment, the treated waste stream 320 exits from outlet 306 of the reactor system 300 for the discharge.

In the present example, the reactors 310 can include a series of two or more stages, e.g., stages 311, 313, and 315. As an example, the reactors 310 be arranged in a grid and each reactor 310 can be connected to one or more reactors 310 in an adjoining column. In the example provided by FIG. 3, a three-column by three-row arrangement of reactors 310 is depicted (e.g., a 3×3 array), although exemplary embodiments of the modular flow through sonochemical reactor system 300 can include more or fewer rows and/or columns. The columns can correspond to the stages 311, 313, and 315. The waste stream 302 enter into the reactors 310 with specific residence time in the first column or stage 311. The exit stream from the reactors 310 in the first column or stage 311 can split into one or more batch reactors in the adjoining column or stage 313. The residence in each reactor 310 can be specified to provide sufficient residence time in total to degrade the PFAS within the series of reactors 310 to a specified level. Such an arrangement of the reactor 310 with lead and lag reactors can provide the flow-through reactor that operates in a semi-continuous or continuous manner. The effluent from the reactors 310 in the last column or stage 315 can satisfy required regulatory compliance for the treated PFAS waste stream 320.

The reactors 310 in the modular flow through sonochemical reactor system 300 can be embodied as embodiments of the batch reactor 100 and/or as embodiments of the flow-type sonochemical reactor 200. As an example, each of the reactors 310 can be embodied by an embodiment of the batch reactor 100 to form a modular semi-continuous flow through sonochemical reactor system. As another example, each of the reactors 310 can be embodied by an embodiment of the flow-type sonochemical reactor 200 to form a modular continuous flow through sonochemical reactor system. As another example, the reactors 310 can be embodied by a combination of an embodiment of the batch reactor 100 and an embodiment of the flow-type sonochemical reactor 200 (e.g., some of the reactors 310 can be embodied as the reactor 100 and some of the reactors 310 can be embodied as the reactor 200) to form a modular semi-continuous flow through sonochemical reactor system, e.g., the reactors 310 of stages 311 and 313 can be embodied as the batch reactor 100 and the reactors 310 in the stage 315 can be embodied as the an embodiment of the flow-type sonochemical reactor 200.

In the present example embodiment, the reactor system 300 can include a first reactor set that has a first reactor 310-1 in series with a second reactor 310-2 in series with a third reactor 310-3; a second reactor set in parallel with the first reactor set, where the second reactor set includes a fourth reactor 310-4 in series with a fifth reactor 310-5 in series with a sixth reactor 310-6; and a third reactor set in parallel with the first reactor set and the second reactor set, where the third reactor set comprising a seventh reactor 310-7 in series with an eighth reactor 310-8 in series with a ninth reactor 310-9.

Exit streams 304-1 from the first reactor 310-1 can be output to the second reactor 310-2, the fifth reactor 310-5, and/or the eighth reactor 310-8 in the stage 313. Exit streams 304-4 from the fourth reactor 310-4 can be output to the second reactor 310-2, the fifth reactor 310-5, and/or the eighth reactor 310-8 of the stage 313. Exit streams 304-7 from the seventh reactor 310-7 can be output to the second reactor 310-2, the fifth reactor 310-5, and/or the eighth reactor 310-8 of the stage 313. Exit streams 304-2 from the second reactor 310-2 can be output to the third reactor 310-3, the sixth reactor 310-6, and/or the ninth reactor 310-9 of the stage 315. Exit streams 304-5 from the fifth reactor 310-5 can be output to the third reactor 310-3, the sixth reactor 310-6, and/or the ninth reactor 310-9 of the stage 315. Exit streams 304-8 from the eighth reactor 310-8 can be output to the third reactor 310-3, the sixth reactor 310-6, and/or the ninth reactor 310-9 of the stage 315. An exit stream from the third reactor, an exit stream from the sixth reactor, and an exit stream from the ninth reactor can be combined as a final exit stream from the modular reactor system 300.

While an embodiment of the modular flow through sonochemical reactor system 300 has been illustrated with a grid arrangement, exemplary embodiments of the modular flow through sonochemical reactor system 300 can have different configurations and/or the configurations of the modular flow through sonochemical reactor system 300 can be specified based on the contaminated waste stream being treated.

While exemplary embodiments have been described herein, it is expressly noted that these embodiments should not be construed as limiting, but rather that additions and modifications to what is expressly described herein also are included within the scope of the present disclosure. Moreover, it is to be understood that the features of the various embodiments described herein are not mutually exclusive and can exist in various combinations and permutations, even if such combinations or permutations are not made express herein, without departing from the spirit and scope of the present disclosure.

What is claimed:

1. A sonochemical reactor system for destroying or mineralizing per- and polyfluoroalkyl substances (PFAS) in a waste stream, the reactor system comprising:
    a reactor defining a chamber for receiving the waste stream, wherein the chamber is defined by a plurality of walls;
    one or more baffles extending from at least one of the plurality of walls into the chamber; and
    a plurality of transducers disposed in the chamber, the plurality of transducers being disposed on the plurality of walls and being operable to induce cavitation in the waste stream to destroy or mineralize the per- and polyfluoroalkyl substances (PFAS) in the waste stream;
    wherein the one or more baffles define a plurality of reactor stages within the chamber, each of the reactor stages including a subset of the plurality of transducers, the subset including at least one pair of the plurality of transducers, the at least one pair of the plurality of transducers being opposingly or adjacently spaced, and each of the plurality of reactor stages defining a different stage of remediation, degradation and/or removal of the per- and polyfluoroalkyl substances (PFAS) from the waste stream.

2. The sonochemical reactor system of claim 1, wherein the subset of the plurality of transducers in each of the plurality of reactor stages operate at a different frequency.

3. The sonochemical reactor system of claim 1, wherein the subset of the plurality of the transducers in a first one of the reactor stages is operable to destroy or mineralize at least a first type of per- and polyfluoroalkyl substances (PFAS) and the subset of the plurality of the transducers in a second one of the reactor stages is operable to destroy or mineralize at least one of the first type or a different type of per- and polyfluoroalkyl substances (PFAS).

4. The sonochemical reactor system of claim 1, wherein the one or more reactors is a flow-type sonochemical reactor that includes the one or more baffles.

5. The sonochemical reactor system of claim 1, wherein the one or more baffles define a sinuous path through the flow-type reactor, the waste stream flowing through the flow-type reactor along the sinuous path.

6. A sonochemical reactor system for destroying or mineralizing per- and polyfluoroalkyl substances (PFAS) in a waste stream, the reactor system comprising:
    one or more reactors defining one or more chambers for receiving the waste stream;
    a plurality of walls defined by at least one of the one or more chambers or one or more baffles disposed in the one or more chambers; and
    a plurality of transducers disposed in the one or more chambers, the plurality of transducers being disposed on the plurality of walls and being operable to induce cavitation in the waste stream to destroy or mineralize the per- and polyfluoroalkyl substances (PFAS) in the waste stream;
    a fluid inlet to an interior volume of the flow-type sonochemical reactor;
    a first baffle of the one or more baffles attached to a first reaction chamber wall, a second baffle of the one or more baffles attached to a second reaction chamber wall, and a third baffle of the one or more baffles attached to the first reaction chamber wall, wherein the waste stream is received via the fluid inlet and directed to the first baffle and the first, second, and third baffles are configured such that the waste stream is directed in a sinuous path from the first baffle to the second baffle and from the second baffle to the third baffle;
    a first transducer of the plurality of transducers attached to a front face of the first baffle;
    a second transducer of the plurality of transducers attached to a rear face of the first baffle;
    a third transducer of the plurality of transducers attached to a front face of the second baffle;
    a fourth transducer of the plurality of transducers attached to a rear face of the second baffle;
    a fifth transducer of the plurality of transducers attached to a front face of the third baffle;
    a sixth transducer of the plurality of transducers attached to a rear face of the third baffle; and
    a fluid outlet through which a treated stream is discharged from the interior volume;
    wherein the one or more reactors define a plurality of reactor stages, each of the reactor stages including a subset of the plurality of transducers, the subset including at least one pair of the plurality of transducers, the at least one pair of the plurality of transducers being opposingly or adjacently spaced.

7. The sonochemical reactor system of claim 1, comprising a modular configuration, wherein a plurality of reactors are operably coupled to each other.

8. The sonochemical reactor system of claim 7, wherein at least one of the plurality of reactors is formed by a batch reactor, wherein the batch reactor comprising:
    plurality of interior faces including a first face along a first reaction chamber wall and a second face along a second reaction chamber wall; and the subset of the plurality of transducers in the batch reactor includes a first transducer attached to the first face and a second transducer attached to the second face.

9. The sonochemical reactor system of claim 7, wherein the first transducer and the second transducer are opposing spaced and facing each other.

10. The sonochemical reactor system of claim 7, wherein at least one of the plurality of reactors is formed by a batch reactor and wherein the first transducer and the second transducer are staggered with respect to each other along a length of the batch reactor.

11. The sonochemical reactor system of claim 8, wherein at least one of the first transducer or the second transducer of the batch reactor is a plate transducer.

12. The sonochemical reactor system of claim 11, wherein the batch reactor comprises:
a third face along a third reaction chamber wall;
a fourth face along a fourth reaction chamber wall;
a third transducer attached to the third face; and
a fourth transducer attached to the fourth face,
wherein the third transducer and the fourth transducer are facing each other.

13. A sonochemical reactor system of for destroying or mineralizing per- and polyfluoroalkyl substances (PFAS) in a waste stream, the reactor system comprising a modular configuration that includes a plurality of reactors are operably coupled to each other, wherein the plurality of reactors include:
one or more chambers for receiving the waste stream;
a plurality of walls defined by at least one of the one or more chambers or one or more baffles disposed in the one or more chambers; and
a plurality of transducers disposed in the one or more chambers, the plurality of transducers being disposed on the plurality of walls and being operable to induce cavitation in the waste stream to destroy or mineralize the per- and polyfluoroalkyl substances (PFAS) in the waste stream;
wherein the plurality of reactors define a plurality of reactor stages, each of the reactor stages including a subset of the plurality of transducers, the subset including at least one pair of the plurality of transducers, the at least one pair of the plurality of transducers being opposingly or adjacently spaced;
wherein the modular configuration includes a first reactor set comprising a first reactor in series with a second reactor in series with a third reactor, and a second reactor set in parallel with the first reactor set, the second reactor set comprising a fourth reactor in series with a fifth reactor in series with a sixth reactor.

14. The sonochemical reactor system of claim 13, wherein a first exit stream from the first reactor is output to the fifth reactor, a first exit stream from the fourth reactor is output to the second reactor, a first exit stream from the second reactor is output to the sixth reactor, and a first exit stream from the fifth reactor is output to the third reactor.

15. The sonochemical reactor system of claim 14, further comprising a third reactor set in parallel with the first reactor set and the second reactor set, the third reactor set comprising a seventh reactor in series with an eighth reactor in series with a ninth reactor.

16. The sonochemical reactor system of claim 15, wherein a second exit stream from the first reactor is output to the eighth reactor, a second exit stream from the fourth reactor is output to the eighth reactor, a second exit stream from the second reactor is output to the ninth reactor, a second exit stream from the fifth reactor is output to the ninth reactor, a first exit stream from the seventh reactor is output to the second reactor, a second exit stream is output from the seventh reactor to the fifth reactor, a first exit stream from the eighth reactor is output to the third reactor, and a second exit stream from the eighth reactor is output to the sixth reactor.

17. The sonochemical reactor system of claim 16, wherein an exit stream from the third reactor, an exit stream from the sixth reactor, and an exit stream from the ninth reactor are combined as a final exit stream from the modular reactor.

* * * * *